(12) United States Patent
Taylor et al.

(10) Patent No.: US 7,487,109 B2
(45) Date of Patent: Feb. 3, 2009

(54) METHOD AND APPARATUS FOR OPTIMIZING A SECURITY DATABASE FOR A SELF-SERVICE CHECKOUT SYSTEM

(75) Inventors: Brian Taylor, Jacksonville, FL (US); John Allard, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 10/038,405

(22) Filed: Jan. 3, 2002

(65) Prior Publication Data

US 2003/0126019 A1 Jul. 3, 2003

(51) Int. Cl.
*G06Q 20/00* (2006.01)
(52) U.S. Cl. ......................................................... 705/21
(58) Field of Classification Search .................. 705/30, 705/16, 21, 20, 64
See application file for complete search history.

(56) References Cited

U.S. PATENT DOCUMENTS

| | | | | |
|---|---|---|---|---|
| 4,676,343 | A | 6/1987 | Humble et al. | 186/61 |
| 4,766,296 | A | 8/1988 | Barth | 235/383 |
| 4,940,116 | A | 7/1990 | O'Connor et al. | 186/61 |
| 4,964,053 | A | 10/1990 | Humble | 364/466 |
| 5,311,969 | A | 5/1994 | Dickover et al. | 186/61 |
| 5,340,970 | A | 8/1994 | Wolfe, Jr. et al. | 235/383 |
| 5,424,521 | A | 6/1995 | Wolfe, Jr. et al. | 235/383 |
| 5,992,570 | A | 11/1999 | Walter et al. | 186/36 |
| 6,089,454 | A * | 7/2000 | Sadler | 235/383 |
| 6,550,583 | B1 * | 4/2003 | Brenhouse | 186/66 |
| 6,728,706 | B2 * | 4/2004 | Aggarwal et al. | 707/5 |
| 6,779,722 | B1 * | 8/2004 | Mason | 235/383 |
| 6,837,428 | B2 * | 1/2005 | Lee et al. | 235/383 |
| 7,044,370 | B2 * | 5/2006 | Bellis et al. | 235/383 |
| 2002/0194074 | A1 * | 12/2002 | Jacobs | 705/16 |
| 2003/0047387 | A1 * | 3/2003 | Bogat | 186/59 |
| 2003/0122667 | A1 * | 7/2003 | Flynn | 340/540 |
| 2003/0217892 | A1 * | 11/2003 | Persky | 186/68 |

* cited by examiner

*Primary Examiner*—Ronald Laneau
(74) *Attorney, Agent, or Firm*—Duke W. Yee; Jason O. Piche; Theodore D. Fay, III

(57) ABSTRACT

A method of optimizing attribute information of a product attribute stored in a product database is provided. The product database includes update information comprising a time that the attribute information has last been updated and correction history information including recorded samples of new attribute information. The attribute information is used as a security measure in a self-checkout purchasing system to confirm that a purchased product is the same product identified by the system after identification information of the product is input by a user of the system. The method includes conducting a query of the database for any products having said update information older than a predetermined period of time, having correction history information, and where the history information includes a plurality of recorded samples greater than a predetermined amount. The query establishes a query result, whereby revised attribute information is then calculated using the plurality of the recorded samples as data. The revised attribute information is then stored as the current attribute information at a time which replaces the time information contained in the database relating to the time the attribute information was last updated.

17 Claims, 3 Drawing Sheets

METHOD AND APPARATUS FOR OPTIMIZING A SECURITY DATABASE FOR A SELF-SERVICE CHECKOUT SYSTEM

BACKGROUND OF THE INVENTION

1. Field of the Invention

The present invention relates to a self-service checkout system, and more particularly to a method and apparatus for optimizing a security attributes database for a plurality of products in a self-service checkout apparatus.

2. The Related Prior Art

U.S. Pat. Nos. 4,676,343, 4,792,018 and 5,340,970, commonly-assigned with the present application, present systems for operator-unattended checkout with particular concern for detection of customer fraud and deterrence of the same.

In U.S. Pat. No. 4,676,343 (hereafter "the '343 patent"), an article selected for purchase has its universal product code (UPC) scanned by a code reader and the code reader output signals effect the fetching from storage of a signal indicative of a measurable characteristic of the article. A measurable characteristic of an article may include a physical characteristic such as the length, width, weight, volume and the like.

The article is placed on a conveyor and led into a security zone defined by inlet and outlet light curtains including a scale for measuring item weight. In the security zone, the measurable characteristic of the selected article is measured by a sensor and the sensor provides an output signal indicative of the measurement. A comparison is made of the sensor output signal and the fetched signal and, if the comparison is favorable, the conveyor continues to move in an article acceptance sense to deliver the article to a bagging area. Should the comparison be negative, however, the movement of the conveyor is reversed and the article placed on the conveyor is returned to the customer.

The system thus detects and rejects customer fraud in substituting a more expensive article having diverse characteristics from those of the article scanned for UPC, additionally the system protects the shopper from being over charged. Beyond the described anti-fraud facility, conveyor movement is reversed on violations of the security zone, as by efforts of a customer to reach into the security zone to substitute articles.

In U.S. Pat. No. 4,792,018, (hereafter the "'018 patent"), various security-related improvements are disclosed, one of which is the reconfiguration of the inlet light curtain to sense the size of a selected article in addition to the role of the curtain in guarding the security zone from fraudulent customer interaction. While the '343 patent contemplates article size also as a measurable article characteristic, the '018 patent discloses the capacity for providing the measured article size information store itself from the inlet light curtain. Thus, as an article is introduced into the security system, its size, as indicated in signals provided from measurement by the inlet light curtain, is storable in the system data base for security purposes. The same may be said of the weight scale in the security zone, i.e., the systems of the commonly-assigned patents may look to weight or size as the measured article characteristic, or jointly to both such security parameters.

U.S. Pat. No. 5,340,970 (hereafter "the '970 patent") discloses an override feature of the above described systems which enables an operator to correct the corresponding measurable characteristic information in the security database. Thus, if an item is improperly returned to the customer because the measurable characteristic of the product stored in the security database is incorrect, the information may be updated by supervisory personnel. Suitable additional measures (operator authorization code input) may be taken to insure that the override is indeed authorized. Once the override is effected, article rejection will only occur again if the measurable characteristic of the particular item is beyond the scope of the range of acceptable values which were updated by supervisory personnel.

The problem with manual updating is that it is grossly inefficient. The rejection of items necessitates store personnel correcting the data and having to visit individual self-checkout lanes as the rejections occur. This results in a delay for the customer, and higher costs by the retail establishment in stationing supervisory personnel and the potential of lost future sales from dissatisfied customers.

Accordingly, there exists a need to be able to automatically optimize the measurable characteristic information contained in the security database without direct human intervention each time a product is rejected during a transaction. This need stems also from the issue of insuring that the system provides reliable security to the store owner (returning items to the customer that should be returned) while also minimizing unnecessary delays to the customer.

SUMMARY OF THE INVENTION

Accordingly, the present invention addresses the above concerns and provides an apparatus and method for optimizing a security database associated with products for purchase.

Thus, it is an object of the present invention to provide a self-checkout system which automatically updates product measurable characteristic information stored in a security database of a self-checkout apparatus.

Accordingly, in one aspect of the present invention, a method of optimizing characteristic information comprising a value for a characteristic of a product stored in a security database of a self-checkout system is presented. The security database includes update information comprising a time that the characteristic information was last updated and correction history information including recorded samples each comprising a new value for the characteristic information. The characteristic information is used as a comparison to a second value associated with the characteristic that is detected in a security area of the self-checkout system. The comparison is used as a security measure to confirm that a product placed in the security area is the same product identified by the system after identification information of the product is input by a user of the system. The method includes querying the database for products having update information older than a predetermined period of time and having correction history information for the characteristic including a plurality of recorded samples each comprising a new prospective value for the characteristic information value. The number of recorded samples is greater than a predetermined amount, whereby the query establishes a query result. The method also includes revising the value of the characteristic information in the security database for each product in the query result using the new values of the recorded samples.

The revising step of the above aspect may include calculating a revised value for the value of the characteristic information using the new values of the recorded samples and storing the revised value in place of the original value of the characteristic previously stored.

Moreover, the previous aspect may also include establishing a time when the characteristic information is revised, and storing that time in place of the time at which the characteristic information for the particular product was last revised.

The characteristic information may include any characteristic information of the particular product including physical characteristics such as weight, height, length, width; and visual and other properties of the product (e.g., electrical, magnetic, radio frequency) as well as auditory and special packaging characteristics.

In another aspect of the present invention, an apparatus for optimizing characteristic information comprising a value for a characteristic of a product stored in a security database of a self-checkout system is presented. The security database includes update information comprising a time that the characteristic information has last been updated and correction history information including recorded samples each comprising to a new value for the characteristic information. The characteristic information is used to compare with a second value associated with the characteristic detected by a security device of the self-checkout system and thus, is used as a security measure to confirm that a product placed in the security area is the same product identified by the system after identification information of the product is input by a user of the system (e.g., UPC scanner). The apparatus includes querying means for querying the database for products having the update information older than a predetermined period of time and having correction history information for the measurable characteristic comprising recorded samples greater than a predetermined amount. The query establishes a query result. The apparatus also includes revising means for revising the value of the characteristic information in the security database for each product in the query result using the recorded samples.

In the above apparatus, the revising means may include calculating means for calculating a revised value for the value of the characteristic information using the new values of the recorded samples and also includes storing means for storing the revised value in place of the original value of the characteristic.

In yet another aspect of the present invention, a system for optimizing a security database for products purchased with a self-checkout system includes a storage device for storing the security database and a processor programmed to query the database for products having the update information older than a predetermined period of time and having correction history information for the characteristic comprising a plurality of recorded samples each having a new value corresponding to the original value of the characteristic information. The recorded samples are greater than a predetermined amount and the query produces a query result. The processor is also programmed to revise the original value of the characteristic information in the security database for each product in the query result using the new values of the recorded samples.

In still another aspect of the present invention, computer readable media having computer-executable instruction for performing the above-described methods is provided. Such media may be any media including random-access memory (RAM), read-only memory (ROM), magnetic storage media and optical storage medial.

In yet another aspect of the present invention, a computer-readable medium having stored thereon a data structure is presented which includes a first field having a value of characteristic information of a characteristic of a product for purchase at a self-checkout system, a second field including update information having a last time when the characteristic information was last updated, and a third field including history information having at least one recorded sample of a new value of the characteristic information obtained since the characteristic information was last updated.

Accordingly, the above objects and aspects will become clearer with reference to the accompanying drawings and detailed written description of the present invention.

DETAILED DESCRIPTION OF THE PREFERRED EMBODIMENTS

Figure 1:
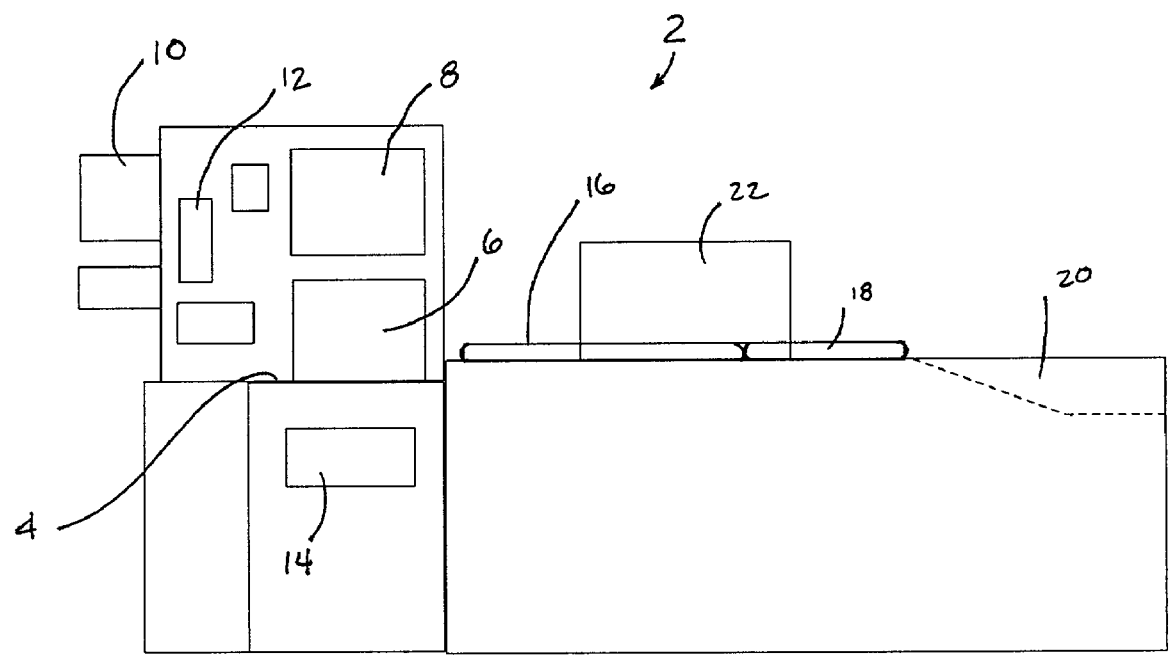
FIG. 1 illustrates a perspective view of a self-checkout lane for a self-checkout system according to the present invention.
Figure 2:
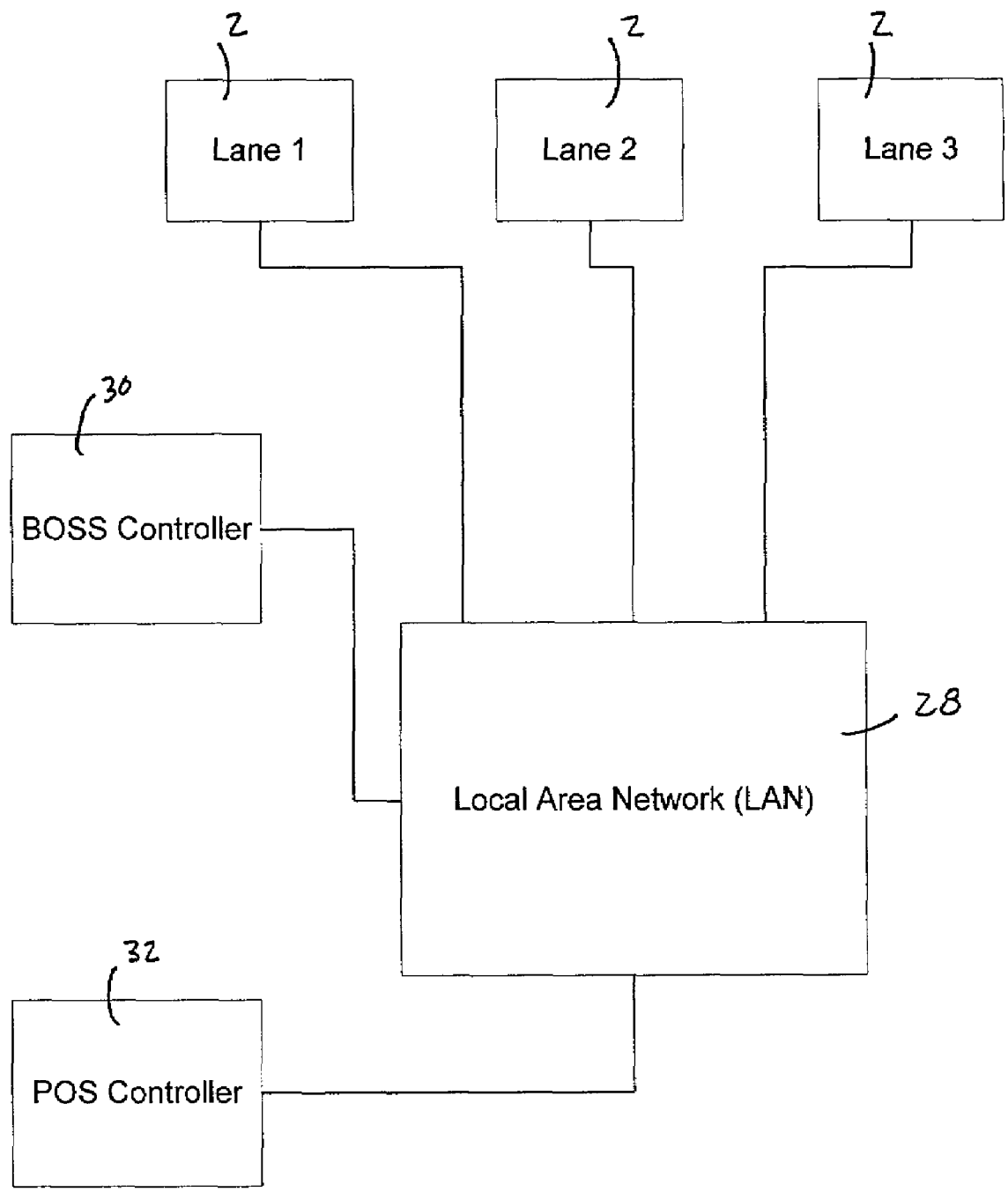
FIG. 2 illustrates a schematic diagram of the system for optimizing a security database of a self-service checkout system according to the present invention.

FIG. 1 is a representative illustration of a self-checkout lane 2 of a self-checkout system having the optimizing method and system according to the present invention. Each lane includes a counter 4, a universal product code reader 6, a display screen 8 for interactive customer communication, payment mechanism 9, including credit card reader 10, cash acceptor 12 and cash dispenser 14 mechanisms, an entry conveyor 16, an out-feed conveyor 18, a bagging area 20, a security tunnel 22, and a receipt unit.

The above described and illustrated lane is preferably used with a security system, which uses the known weight of each item to protect against consumer fraud. Using an identification code, preferably a UPC code, the product for purchasing is scanned for purchase, which identifies the product to a UPC database. The database includes associated information about the product including price and measurable characteristic information including physical parameters such as dimensions and weight. After the product is scanned, it is placed on a weighing conveyor which weighs the product while transporting it to a security area. If the measured weight is within a predetermined tolerance of the weight listed for the product in the database, the item is transported to a bagging area. If the weight of the product is not within the tolerance for the weight information from the database, the conveyor is reversed and the shopper is requested to re-scan the product. Such a system is disclosed in the '343 patent, the entire disclosure of which is incorporated herein by reference.

In the present invention, a plurality of such lanes 2 are linked to a local area network (LAN) 28, which is also linked with a back office system server (BOSS) controller 30 and a Point-Of-Sale (POS) Controller 32. The BOSS controller manages database information for the lanes, i.e., all the information relating to the products which are scanned, including security aspects of the products like volume, weight, dimensions, and other measurable characteristics. Supervisory personnel can update this database either at the BOSS controller or they can update a copy of the database at a particular lane. Synchronizing software stored in the lane and/or BOSS controller and run at predetermined intervals, allows updated database information to be passed from each lane to the controller, then from the controller to each lane. Thus, changes implemented at one lane will ultimately pass to the copy of the database stored at the other lanes.

Supervisory personnel may also use the BOSS controller to generate sales and lane performance reports, although such reports may be setup to run at a lane. One skilled in the art will appreciate, however, that an individual lane may be configured to operate as a BOSS controller if necessary, and that the present system does not require a BOSS controller to operate.

The POS controller manages the point of sale functions of the lanes, and also manages the pricing database for products, including type 2 products, or, sold-by-weight products (i.e., meats, salads, and the like). The POS controller is in communication with each lane independently, and its operation is not impacted by the presence (or lack of) the BOSS controller.

The controllers at the lanes may also include a copy each of the pricing database from the point of sale controller as well as (as stated earlier) the security database from the BOSS controller. Thus, the lanes may operate independently of those controllers over a period of time. Preferably, however, the self-checkout system according to the present invention is operated with the point-of-sale controller and BOSS controller.

In the present invention, the database comprises the data listed below: One skilled in the art will appreciate that the data of the database are described by way of example only, and not meant to limit the invention.

The database is comprised of the following security information:

ItemId—The database contains an identification code for all items. The identification code is the primary link between the item and associated database data for the item.

ItemIndex—The database contains information defining the number of records associated with an individual item.

ItemDesciption—The database contains item descriptions that are retrieved from the POS system.

TransportFull-TransportMini—The database contains information defining how the shopper should handle the item when it is being processed. It defines where the item should be placed after it is processed.

ItemType—The database contains information on how to apply security based on how the item is sold. Items can be sold by each, weight, quantity.

ItemQty—The database contains limit information defining the maximum quantity that can be purchased with one entry.

PreservePromptForQty—The database contains information on how to maintain specific item types.

NumActiveHeights—The database contains the number of height ranges to be used when checking the items' height and if height checking should be performed. If zero number of height ranges is specified, no height checking is performed.

Height1Min-Height1Max-Height2Min-Height2Max-Height3Min-Height3Max—The database contains height range information defining the dimensions of the item. Up to three range dimensions can be specified per record.

NumActiveWeights—The database contains the number of weight ranges to be used when checking the items' weight and if weight checking should be performed. If zero number of weight ranges is specified, no weight checking is performed.

Weigtht1Min-Weight1Max—The database contains weight range information defining the possible weights of the item.

SecurityAlert—The database contains information defining special action required when the item is purchased WgtReqTare—The database contains information defining the weight of packaging material used to package an item.

ScaleLookupUp-NumActiveType2Prices—The database contains information defining the number of price/weight or price/count values associated with type 2 items.

Type2Price1-Type2Price2—The database contains up to two prices per record for type 2 item.

Type2ByCnt_1-Type2ByCnt_2—The database contains information defining if the type 2 item is sold by weight or by count.

Type2Tare_1-Type2Tare_2—The database contains information defining the packaging weight for type 2 items.

Type2ForcedTare_1-Type2ForcedTare_2—The database contains information defining if the packaging weight should be used as a range or an absolute value.

PosTolerance-NegTolerance—The database contains weight tolerances to used to adjust weight ranges, tares, and static system tolerances.

NofInformationActive-NofPrice-NofTaxMod1-NofTaxMod2-NofTaxMod3-NofTaxMod4—The database contains price, department, tax, food stamp, etc. information for items that are not defined in the POS System.

MaintenanceRequired—The database contains information to identify records that need to be corrected via History Analyzer.

LongItem—The database contains information used to identify an items size if it is larger than a specified size.

BreadTail—The database contains information describing packaging characteristics that may cause expected false readings from security measuring devices.

AudioFileName—The database contains audio file information used to voice item descriptions for specified items.

Flags—The database contains general purpose flags to identify specific item characteristics and item processing methods.

RecordStatus—The database contains information defining learn and active status parameters to determine if the record has developed enough information to be used to enforce security.

UpdateSource—The database contains information to define how the information was last updated.

RecLock—The database contains information that locks a record and prevents it from being changed.

TimeStamp—The database contains information defining when the information was last updated.

The database is comprised of the following history information:

ItemId—The database contains an identification code for all items. The identification code is the primary link between the item and associated database data for the item.

MeasuredHeight—The database contains information defining every height measurement made for every item processed by the automated checkout system.

TotalSamples (height)—The database contains information defining the number of times each specific height for an item has been measured.

AnalyzedSamples (height)—The database retains a height sample count that was used to previously determine appropriate security for the item.

TimeStamp (height)—The database contains the time and date when the last update was made to a specific height.

MasterSamples (height)—The database contains the number of height samples measured for a specific height used to define a master database.

MeasuredWeight—The database contains information defining every weight measurement made for every item processed by the automated checkout system.

TotalSamples (weight)—The database contains information defining the number of times each specific weight for an item has been measured.

AnalyzedSamples (weight)—The database retains a weight sample count that was used to previously determine appropriate security for the item.

TimeStamp (weight)—The database contains the time and date when the last update was made to a specific weight.

MasterSamples (weight)—The database contains the number of weight samples measured for a specific weight that used to define a master database.

TotalSamples (long)—The database contains information defining the number of times the item was detected to be long.

AnalyzedSamples (long)—The database retains a long item sample count that was used to previously determine appropriate security for the item.

TimeStamp (long)—The database contains the time and date when the last long item count was updated.

MasterSamples (long)—The database contains the number of long item samples that were used to define a master database.

MultiBreak—The database contains information defining multi-break packaging types (short and long).

TotalSamples (multi-break)—The database contains information defining the number of times each multi-break type was detected.

AnalyzedSamples (multi-break)—The database retains a multi-break type sample count that was used to previously determine appropriate security for the item.

TimeStamp (multi-break)—The database contains the time and date when the last multi-break count was updated.

MasterSamples (multi-break)—The database contains the number of multi-break samples that were used to define a master database.

One of the novel features of the present invention is an optimization method which performs automated maintenance to the database based on statistical analysis of previously measured samples.

Figure 3:
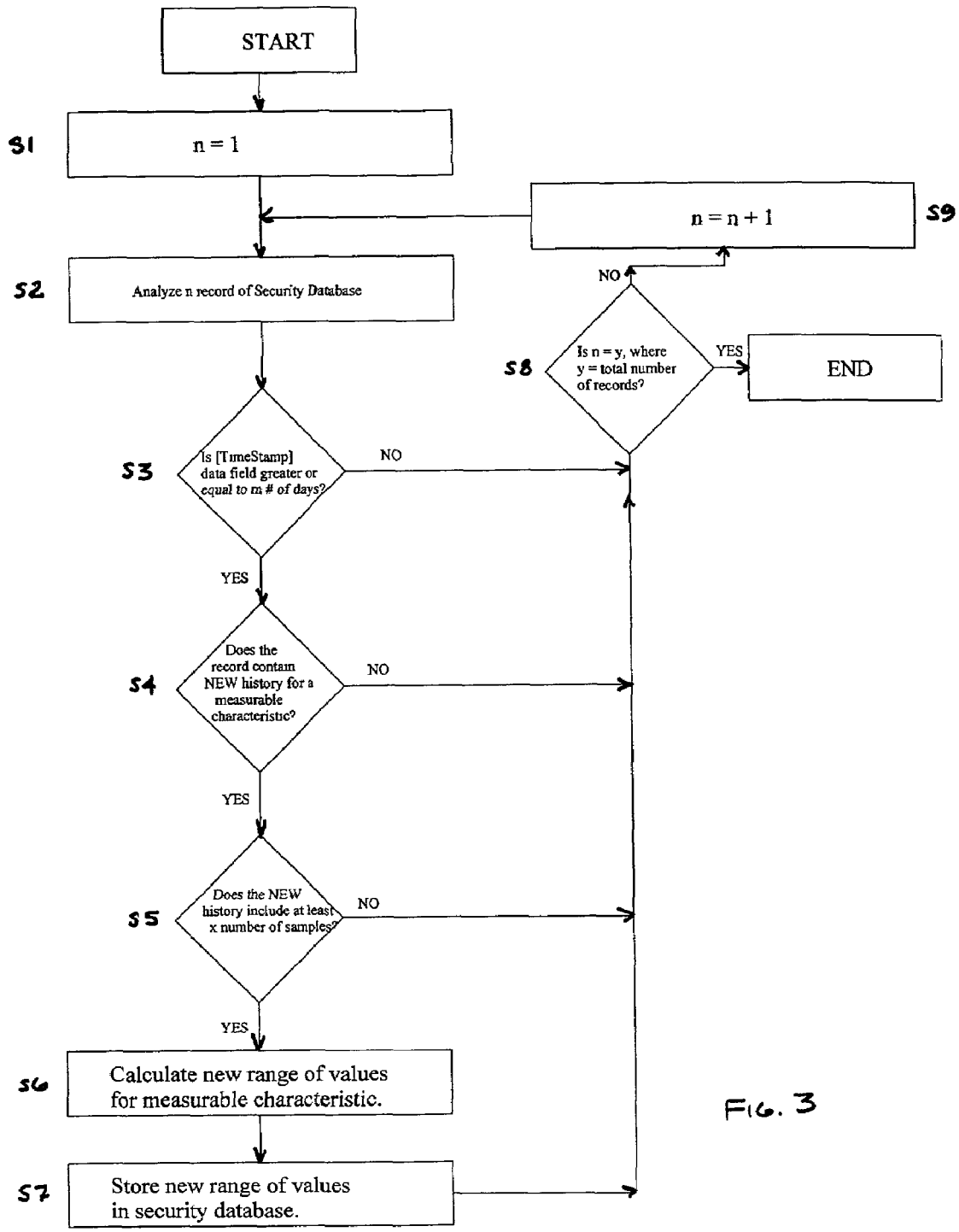
FIG. 3 illustrates a flowchart, which details the process for optimizing the security database for the self-service checkout system according to the present invention.

Specifically, each record (starting with the first record, n=1; see Step S1-S2, FIG. 3) is analyzed by querying the database for any records having the Maintenance Required field set. The query also searches for items matching either of the following criteria:

[TimeStamp] field is older than a predetermined number of days (between 1 and 365)(see Step S3) and at least one of the following flags in the security database is set (Step S4):

Each of these fields is an indicator as to why history is being collected for a particular product.

The method loops through each of these records, looking for NEW history (samples collected since the last time a record was successfully analyzed). If enough new history is found (Step S5), the following analysis of the item is performed.

Weight analysis. If at least 25 new samples have been collected, the security weight range is calculated and updated.

Height analysis. If at least 100 new samples have been collected, the security height range is calculated and updated.

Multi-break analysis. If at least 25 new samples have been collected, the [BreadTail] field is calculated and updated.

Long item analysis. If at least 25 new samples have been collected, the [LongItem] field is calculated and updated.

If any of the four analyses for a particular item results in a new range of values, then the following clean-up tasks may be performed:

(1) All existing alternate security records for the item are deleted. If, for example, the weight analysis succeeded, but the height analysis failed, then the height information from the alternate records will be incorporated into the primary record before deletion.

(2) The [AnalyzedSamples] field in each of the appropriate history database tables is updated to reflect that an analysis has occurred. This field records the number of samples included in the analysis.

(3) An entry is created in the [AutomatedMaintenance] table in the security database to log the changed security record.

(4) The following security record fields are updated as indicated:

[RecordStatus]=Update. This will trigger the Boss Manager to notify the other lanes of the changed record,
[UpdateSource]=Plotter Batch File If all four aspects of the analysis (weight, height, etc.) are successful, then the [TimeStamp] is then set to the current time.

If, among the history records for a particular item, the most recent [TimeStamp] is older than a particular period of time (say 365 days), then the history for the item is deleted While the system of the present invention has been described with reference to the check-out counters of a supermarket, it should be apparent to those skilled in the art that the system can be applied to any distribution system wherein articles bearing individual media that contain identification data are to be maintained under control.

Having described the invention with reference to the presently preferred embodiments, it should be understood that numerous changes in construction and operation may be introduced without departing from the true spirit of the invention as defined in the appended claims.

What is claimed is:

1. A method of optimizing a value associated with a characteristic of a product stored in a first field of a security database of a self-checkout system at an optimizing time, said security database also including a second field for storing identification information for said product, a third field for storing a last time when said value was last updated and a fourth field for storing at least one new value for said characteristic stored in said first field between said last time and said optimizing time, said value being used in a comparison to a second value associated with said characteristic and detected in a security area of said self-checkout system during a purchasing transaction, said comparison used as a security measure to confirm that a product placed in said security area during said purchasing transaction is the same product identified by said system after said system identifies said product via identification information input by a user of said system, said method comprising;

querying said database for products having a time difference between said optimizing time and said last time greater than a predetermined period and having at least one new value for said characteristic, wherein said query establishes a query result; and revising said value for each product in said query result using said new value.

2. The method according to claim 1, wherein said query looks for products having a plurality of new values.

3. The method according to claim 1, wherein said query looks for products having a plurality of new values greater than a predetermined amount.

4. The method according to claim 1, wherein said revising step comprises calculating a revised value for said value of said characteristic said new value.

5. The method according to claim 4, further comprising storing said revised value in place of said value.

6. The method according to claim 1, wherein said characteristic comprises a measurable characteristic of a product.

7. The method according to claim 6, wherein said measurable characteristic comprises a physical characteristic of said product.

8. The method according to claim 7, wherein said physical characteristic comprises a height of said product.

9. The method according to claim 7, wherein said physical characteristic comprises a length of said product.

10. The method according to claim 7, wherein said physical characteristic comprises a weight of said product.

11. The method according to claim 3, wherein said predetermined amount of new values is between 2-100.

12. The method according to claim 1, wherein said characteristic comprises a visual characteristic.

13. The method according to claim 1, wherein said characteristic comprises an auditory characteristic.

14. The method according to claim 1, wherein a plurality of characteristics each comprise a value.

15. An apparatus for optimizing characteristic information comprising a value for a characteristic of a product stored in a security database of a self-checkout system, said security database including update information comprising a time that said characteristic information has last been updated and correction history information including recorded samples each comprising a new value for said characteristic information, said characteristic information used to compare to a second value associated with said characteristic detected by a security device of said self-checkout system, said characteristic information used as a security measure to confirm that a product placed in said security area is the same product identified by said system after identification information of said product is input by a user of said system, said apparatus comprising;
 querying means for querying said database for products having said update information older than a predetermined period of time and having correction history information for said measurable characteristic comprising recorded samples greater than a predetermined amount, wherein said query establishes a query result; and
 revising means for revising said value of said characteristic information in said security database for each product in said query result using said recorded samples.

16. The apparatus according to claim 13, wherein said revising means comprises calculating means for calculating a revised value for said value of said characteristic information by averaging said new values of said recorded samples and storing means for storing said revised value in place of said value of said characteristic.

17. The apparatus according to claim 13, wherein said revising means is conducted at a second time, and wherein said second time is stored by a storing means in place of said time of said update information for evidencing the time at which a revision of said value of said characteristic information is conducted.

\* \* \* \* \*